US012623712B2

(12) United States Patent (10) Patent No.: US 12,623,712 B2
Li et al. (45) Date of Patent: May 12, 2026

(54) STEERING COLUMN FOR VEHICLE AND VEHICLE

(71) Applicants: ZHEJIANG ZEEKR INTELLIGENT TECHNOLOGY CO., LTD., Ningbo (CN); ZHEJIANG GEELY HOLDING GROUP CO., LTD., Hangzhou (CN)

(72) Inventors: Fuhai Li, Ningbo (CN); Lei Ding, Ningbo (CN); Lixin Luo, Ningbo (CN); Jianfeng Bian, Ningbo (CN); Zuguo Ma, Ningbo (CN)

(73) Assignees: ZHEJIANG ZEEKR INTELLIGENT TECHNOLOGY CO., LTD., Ningbo (CN); ZHEJIANG GEELY HOLDING GROUP CO., LTD., Hangzhou (CN)

( * ) Notice: Subject to any disclaimer, the term of this patent is extended or adjusted under 35 U.S.C. 154(b) by 0 days.

(21) Appl. No.: 19/084,772

(22) Filed: Mar. 20, 2025

(65) Prior Publication Data

US 2025/0214643 A1 Jul. 3, 2025

Related U.S. Application Data

(63) Continuation of application No. PCT/CN2023/107959, filed on Jul. 18, 2023.

(30) Foreign Application Priority Data

Oct. 24, 2022 (CN) .......................... 202211304450.0

(51) Int. Cl.
B62D 1/19 (2006.01)
B62D 1/181 (2006.01)
(Continued)

(52) U.S. Cl.
CPC ............. B62D 1/197 (2013.01); B62D 1/181 (2013.01); B62D 1/185 (2013.01); B62D 1/19 (2013.01);
(Continued)

(58) Field of Classification Search
CPC .......... B62D 1/19; B62D 1/192; B62D 1/195; B62D 1/197; B62D 1/16; B62D 1/18;
(Continued)

(56) References Cited

U.S. PATENT DOCUMENTS 5,706,704 A * 1/1998 Riefe ..................... F16F 7/125
188/371
6,170,873 B1 1/2001 Jurik et al.
(Continued)

FOREIGN PATENT DOCUMENTS

CN 101195350 A 6/2008
CN 101195383 A 6/2008
(Continued)

OTHER PUBLICATIONS

International Search Report dated Nov. 3, 2023 in International Application No. PCT/CN2023/107959. English translation attached.
(Continued)

*Primary Examiner* — Keith J Frisby

(57) ABSTRACT

Provided are a steering column for a vehicle and a vehicle. The steering column includes a first mounting plate, an adjustment plate, an upper column, an adjustment mechanism, and an energy absorption mechanism. The adjustment plate is movably connected to the first mounting plate in a first direction. The upper column is fixed to the adjustment plate. The adjustment mechanism includes a drive portion and a first adjustment portion. The drive portion is fixed to the first mounting plate. The energy absorption mechanism includes an energy absorption block and an energy absorp- (Continued)

tion strip. The energy absorption block is connected to the adjustment plate and the first adjustment portion. The energy absorption block has an energy absorption groove extending in a curved shape. The energy absorption groove is movable along the energy absorption strip in the first direction when an impact force borne by the adjustment plate reaches a predetermined threshold.

16 Claims, 3 Drawing Sheets

(51) Int. Cl.
*B62D 1/185* (2006.01)
*F16F 7/12* (2006.01)

(52) U.S. Cl.
CPC ............. *B62D 1/192* (2013.01); *B62D 1/195* (2013.01); *F16F 7/123* (2013.01); *F16F 7/125* (2013.01); *F16F 7/128* (2013.01)

(58) Field of Classification Search
CPC ........ B62D 1/181; B62D 1/183; B62D 1/184; B62D 1/185; B62D 1/187; B62D 1/189; F16F 7/123; F16F 7/125; F16F 7/128; F16F 7/12
USPC ........... 280/777, 775; 74/492, 493; 188/371, 188/374
See application file for complete search history.

(56) References Cited

U.S. PATENT DOCUMENTS

| | | | | |
|---|---|---|---|---|
| 6,322,103 | B1* | 11/2001 | Li | B62D 1/195 |
| | | | | 74/492 |
| 6,394,241 | B1 | 5/2002 | Desjardins et al. | |
| 6,450,532 | B1* | 9/2002 | Ryne | B62D 1/195 |
| | | | | 188/374 |
| 2003/0075913 | A1* | 4/2003 | Li | F16F 7/123 |
| | | | | 280/777 |
| 2003/0226417 | A1* | 12/2003 | Manwaring | B62D 1/195 |
| | | | | 74/492 |
| 2004/0000780 | A1 | 1/2004 | Li | |
| 2004/0004348 | A1* | 1/2004 | Manwaring | B62D 1/195 |
| | | | | 280/777 |
| 2004/0100084 | A1* | 5/2004 | Munro | B62D 1/195 |
| | | | | 280/777 |
| 2004/0164538 | A1* | 8/2004 | Li | F16F 7/123 |
| | | | | 280/777 |
| 2005/0029794 | A1* | 2/2005 | Riefe | B60T 7/065 |
| | | | | 280/775 |
| 2005/0194777 | A1* | 9/2005 | Manwaring | B62D 1/195 |
| | | | | 280/777 |
| 2005/0285383 | A1* | 12/2005 | Yae | B62D 1/195 |
| | | | | 280/777 |
| 2006/0049621 | A1* | 3/2006 | Lee | B62D 1/195 |
| | | | | 280/777 |
| 2006/0273568 | A1* | 12/2006 | Manwaring | B62D 1/195 |
| | | | | 280/775 |
| 2006/0273569 | A1* | 12/2006 | Manwaring | F16F 7/123 |
| | | | | 280/775 |
| 2009/0033082 | A1* | 2/2009 | Klukowski | F16F 1/361 |
| | | | | 280/777 |

| | | | | |
|---|---|---|---|---|
| 2010/0032933 | A1* | 2/2010 | Cymbal | B62D 1/195 |
| | | | | 280/777 |
| 2014/0083236 | A1 | 3/2014 | Moriyama et al. | |
| 2016/0046318 | A1* | 2/2016 | Stinebring | B62D 1/181 |
| | | | | 74/493 |
| 2019/0100230 | A1* | 4/2019 | Messing | B62D 1/195 |
| 2019/0152512 | A1 | 5/2019 | Ku | |
| 2020/0039569 | A1 | 2/2020 | Schnitzer et al. | |
| 2020/0149606 | A1 | 5/2020 | Lingemann | |
| 2021/0024121 | A1 | 1/2021 | Matsuno | |
| 2022/0063703 | A1 | 3/2022 | Mcclelland et al. | |

FOREIGN PATENT DOCUMENTS

| | | | |
|---|---|---|---|
| CN | 201195550 | Y | 2/2009 |
| CN | 101863238 | A | 10/2010 |
| CN | 201863882 | U | 6/2011 |
| CN | 102834310 | A | 12/2012 |
| CN | 102837724 | A | 12/2012 |
| CN | 202716925 | U | 2/2013 |
| CN | 103171610 | A | 6/2013 |
| CN | 103818428 | A | 5/2014 |
| CN | 104843051 | A | 8/2015 |
| CN | 206374797 | U | 8/2017 |
| CN | 207889803 | U | 9/2018 |
| CN | 208682905 | U | 4/2019 |
| CN | 110077453 | A | 8/2019 |
| CN | 112109796 | A | 12/2020 |
| CN | 112429072 | A | 3/2021 |
| CN | 113212535 | A | 8/2021 |
| CN | 214565610 | U | 11/2021 |
| CN | 215398887 | U | 1/2022 |
| CN | 216070174 | U | 3/2022 |
| CN | 216580686 | U | 5/2022 |
| CN | 115447658 | A | 12/2022 |
| DE | 102016200649 | A1 | 7/2017 |
| JP | H074254 | U | 1/1995 |
| JP | 2005001517 | A | 1/2005 |
| JP | 2006219014 | A | 8/2006 |
| JP | 2007022535 | A * | 2/2007 |
| JP | 2009132358 | A | 6/2009 |
| JP | 2010188901 | A | 9/2010 |
| JP | 2016074340 | A | 5/2016 |
| JP | 2017119484 | A | 7/2017 |
| JP | 2020050279 | A | 4/2020 |
| KR | 20080068333 | A | 7/2008 |

OTHER PUBLICATIONS

First Office Action from corresponding Chinese Application No. 202211304450.0, dated May 16, 2023. English translation attached.
The Grant Notice from corresponding Chinese Application No. 202211304450.0, dated Jun. 30, 2023. English translation attached.
Yan, Xianhai. "Research on Key Techniques of energy absorbing steering column and its impact analysis" A Full text of China's outstanding master's degree thesis Database Engineering Technology Series, Issue 5, May 15, 2017, page C035-55.
Gao, Chengyan et al. "Deformation Research and Simulation Optimization of Energy Absorbing Strap of Steering Column" Automobile Parts, Issue 10, Oct. 28, 2020.
Extended European Search Report dated Aug. 21, 2025 received in corresponding European Application No. EP23881337.2.
Notice of Reasons for Refusal dated Mar. 3, 2026 received in corresponding patent family application No. JP2025501870. English translation attached.

* cited by examiner

STEERING COLUMN FOR VEHICLE AND VEHICLE

CROSS-REFERENCE TO RELATED APPLICATION

This application is a continuation of International Application No. PCT/CN2023/107959, filed on Jul. 18, 2023, which claims priority to Chinese Patent Application No. 202211304450.0, entitled "STEERING COLUMN FOR VEHICLE AND VEHICLE" and filed on Oct. 24, 2022, the entire contents of which are incorporated herein by reference.

FIELD

The present disclosure relates to the field of vehicle technologies, and more particularly, to a steering column for a vehicle and a vehicle.

BACKGROUND

With the continuous development of vehicle technologies, vehicle safety has been widely concerned by people. When a vehicle collision occurs, a steering column and a steering wheel on the steering column are easy to cause injuries to a driver.

In the related art, the steering column is designed with a shrinkable energy absorption structure to protect the driver during a collision. However, an existing shrinkable energy absorption structure is complicated, costly to assemble and maintain, and may cause the steering column to drop during the collision, leading to secondary injuries to the driver.

SUMMARY

A steering column for a vehicle according to embodiments of the present disclosure includes a first mounting plate, an adjustment plate, an upper column, an adjustment mechanism, and an energy absorption mechanism. The adjustment plate is movably connected to the first mounting plate in a first direction. The upper column is fixed to the adjustment plate. The adjustment mechanism includes a drive portion and a first adjustment portion. The drive portion is fixed to the first mounting plate and configured to drive the first adjustment portion to move in the first direction. The energy absorption mechanism includes an energy absorption block and an energy absorption strip. The energy absorption block is fixedly connected to the adjustment plate and the first adjustment portion. The energy absorption block internally has an energy absorption groove extending in a curved shape. The energy absorption strip has an end passing through the energy absorption groove and fixed to the first adjustment portion and another end extending in the first direction. The energy absorption groove is movable along the energy absorption strip in the first direction when an impact force borne by the adjustment plate reaches a predetermined threshold.

According to some embodiments of the present disclosure, the energy absorption block includes a body portion and a connection arm. The body portion is fixed to the adjustment plate. The energy absorption groove is formed in the body portion. The connection arm is connected to the body portion and fixedly connected to the first adjustment portion. A weakening structure is formed at a joint between the connection arm and the body portion and located at a side of the first adjustment portion facing towards the adjustment plate. When the impact force borne by the adjustment plate reaches the predetermined threshold, the body portion is separated from the connection arm at the weakening structure and moves along the energy absorption strip.

According to some embodiments of the present disclosure, the weakening structure has a thinning groove. A length direction of the thinning groove is perpendicular to the first direction and parallel to the adjustment plate.

According to some embodiments of the present disclosure, the weakening structure has a plurality of weakening holes arranged in a direction perpendicular to the first direction and parallel to the adjustment plate.

According to some embodiments of the present disclosure, the adjustment plate has a mounting recess. The body portion is at least partially disposed in the mounting recess.

According to some embodiments of the present disclosure, the body portion includes a first sub-portion and a second sub-portion. The energy absorption groove is formed in the first sub-portion and has a side opening formed at a side surface of the first sub-portion, and the second sub-portion is adapted to be fixedly connected to the first sub-portion to block the side opening. The side surface of the first sub-portion is perpendicular to the energy absorption groove.

According to some embodiments of the present disclosure, one of the first sub-portion and the second sub-portion is provided with a positioning pin; and another one of the first sub-portion and the second sub-portion has a positioning hole adapted to be engaged with the positioning pin.

According to some embodiments of the present disclosure, the steering column further includes a second mounting plate. The first mounting plate is movably connected to the second mounting plate in the first direction. The adjustment mechanism further includes a second lead screw fixed to the second mounting plate. The first adjustment portion is a nut. The drive portion includes a drive motor, a drive box, and a first lead screw. The drive motor is fixed to the first mounting plate through the drive box. The drive box is in a transmission connection with the drive motor, the second lead screw, and the first lead screw. The drive motor is configured to drive the first adjustment portion to move in the first direction by means of the drive box and the first lead screw, and the drive motor is further configured to drive the drive box to move along the second lead screw in the first direction.

According to an embodiment of the present disclosure, the energy adsorption strip is a steel strip.

A vehicle according to an embodiment of another aspect of the present disclosure includes the steering column as described above.

Additional aspects and advantages of the present disclosure will be in part set forth below, become apparent in part from the following description, or can be learned by practice of the present disclosure.

Figures 1, 2:
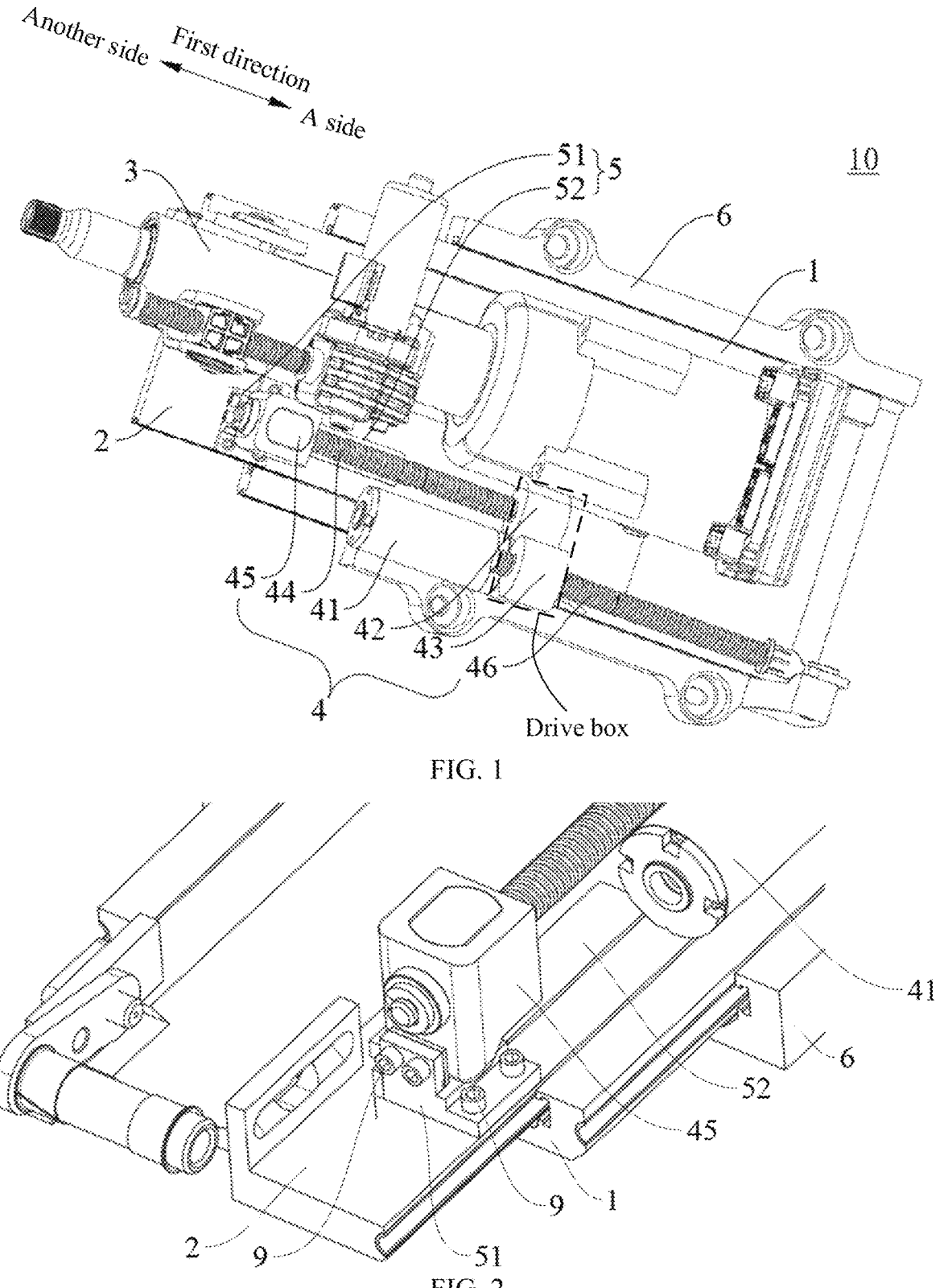
FIG. 1 is a schematic view of a steering column according to an embodiment of the present disclosure.
FIG. 2 is a partially enlarged view at an energy absorption mechanism in FIG. 1.

REFERENCE NUMERALS first mounting plate 1, adjustment plate 2, upper column 3, adjustment mechanism 4, drive motor 41, first driven gear 42, second driven gear 43, first lead screw 44, first adjustment portion 45, second lead screw 46, energy absorption mechanism 5, energy absorption block 51, body portion 511, energy absorption groove 5111, first sub-portion 5112, second sub-portion 5113, side opening 5114, positioning pin 5115, positioning hole 5116, first mounting table 5117, third mounting hole 5118, second mounting table 5119, fourth mounting hole 5120, connection arm 512, first mounting hole 5121, weakening structure 513, energy absorption strip 52, fixed segment 521, mounting segment 522, free segment 523, second mounting plate 6, fastener 9, steering column 10.

DETAILED DESCRIPTION

The embodiments of the present disclosure will be described in detail below, examples thereof are illustrated in the accompanying drawings, throughout which same or similar elements, or elements having same or similar functions, are denoted by same or similar reference numerals. The embodiments described below with reference to the accompanying drawings are exemplary, only used to explain the present disclosure, and should not be construed as limitation of the present disclosure.

In the description of the present disclosure, it needs to be understood that, orientation or position relationship indicated by terms such as "length", "width", "thickness", "over", "below", "in", and "out" is based on the orientation or position relationship illustrated in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure.

In addition, terms such as "first" and "second" are only used for descriptive purposes, and cannot be understood as indicating or implying relative importance or implicitly indicating the number of indicated technical features. Therefore, the feature associated with "first" and "second" may include one or more this feature distinctly or implicitly. In the description of the present disclosure, unless otherwise specifically defined, "plurality" means at least two, such as two, three, etc.

In the present disclosure, unless otherwise clearly specified and limited, terms such as "install", "connect", "connect to", "fix", and the like should be understood in a broad sense. For example, it may be a fixed connection or a detachable connection or connection as one piece; mechanical connection or electrical connection or communication; direct connection or indirect connection through an intermediate; internal communication of two components or the interaction relationship between two components. For those of ordinary skill in the art, the specific meanings of the above terms in the present disclosure can be interpreted depending on specific situations.

The present disclosure aims to solve at least one of the technical problems in the related art to some extent. To this end, the present disclosure provides a steering column for a vehicle, which can reduce severity of driver injuries during a collision and improve safety performance of the steering column.

The present disclosure further provides a vehicle having the steering column as described above.

A steering column 10 for a vehicle according to the embodiments of the present disclosure is described in detail with reference to FIG. 1 to FIG. 5.

Referring to FIG. 1 to FIG. 5, the steering column 10 for the vehicle includes a first mounting plate 1, an adjustment plate 2, an upper column 3, an adjustment mechanism 4, and an energy absorption mechanism 5.

The adjustment plate 2 is movably connected to the first mounting plate 1 in a first direction. The first mounting plate 1 and the adjustment plate 2 may be connected to each other by a linear bearing. The upper column 3 is fixed to the adjustment plate 2. The first direction may be an axial direction of the upper column 3. An upper end of the upper column 3 is connected to a steering wheel of the vehicle. The adjustment plate 2 may be moved to change a position of the upper end of the upper column 3, realizing a position adjustment of the steering wheel.

The adjustment mechanism 4 includes a drive portion and a first adjustment portion 45. The drive portion is fixed to the first mounting plate 1 and configured to drive the first adjustment portion 45 to move in the first direction. The first adjustment portion 45 may drive the adjustment plate 2 to move relative to the first mounting plate 1 in the first direction, further realizing position adjustments of the upper column 3 and the steering wheel.

The energy absorption mechanism 5 includes an energy absorption block 51 and an energy absorption strip 52. The energy absorption block 51 is fixedly connected to the adjustment plate 2 and the first adjustment portion 45. The energy absorption block 51 internally has an energy absorption groove 5111 extending in a curved shape. The energy absorption groove 5111 has a groove segment bent in the first direction. In some embodiments, the energy absorption groove 5111 includes a groove segment of a semicircular arc shape or a groove segment of a sinusoidal shape. The energy absorption strip 52 has an end passing through the energy absorption groove 5111 and fixed to the first adjustment portion 45 and another end extending in the first direction.

During the position adjustment of the upper column 3, the drive portion drives the first adjustment portion 45 to move in the first direction. Each of the energy absorption block 51 and the energy absorption strip 52 is fixedly connected to the first adjustment portion 45, the adjustment plate 2 is fixedly connected to the first adjustment portion 45 through the energy absorption block 51, and the upper column 3 is fixedly connected to the adjustment plate 2. Therefore, the first adjustment portion 45 can drive the energy absorption block 51, the energy absorption strip 52, the adjustment plate 2, and the upper column 3 to move synchronously in the first direction to achieve normal height adjustments of the upper column 3 and the steering wheel, satisfying driver's manipulation comfort requirements.

When an impact force borne by the adjustment plate 2 reaches a predetermined threshold, the energy absorption groove 5111 is movable along the energy absorption strip 52 in the first direction, allowing the energy absorption strip 52 to be deformed and absorb energy. In this way, during a vehicle collision, the upper column 3 and the adjustment plate 2 may move away from the driver, and impact energy is absorbed by the deformation of the energy absorption strip 52 to reduce severity of driver injuries.

In some embodiments, when a vehicle collision occurs, the driver impacts the steering wheel due to inertia. The steering wheel, the upper column 3, and the adjustment plate 2 are rigidly connected to one another. An impact force generated by the driver's impact on the steering wheel is directed to a side of the first direction, i.e., a side away from the driver in the first direction. When the impact force is transferred to the adjustment plate 2, the adjustment plate 2 and the energy absorption block 51 connected to the adjustment plate 2 tend to move towards the side of the first direction. The first adjustment portion 45 is fixed to the first mounting plate 1 through the drive portion. The first adjustment portion 45 prevents a movement of the adjustment plate 2 by the energy absorption block 51, causing the energy absorption block 51 to bear a shear force and be fractured, resulting in failure of a rigid connection between the adjustment plate 2 and the first adjustment portion 45. The adjustment plate 2 drives a part of the energy absorption block 51 having the energy absorption groove 5111 to move towards the side of the first direction. At this time, since the end of the energy absorption strip 52 passing through the energy absorption groove 5111 is fixed to the first adjustment portion 45, the energy absorption groove 5111 moves towards the side of the first direction along the energy absorption strip 52 in the first direction. In other words, the energy absorption groove 5111 moves from a fixed end of the energy absorption strip 52 to a free end of the energy absorption strip 52. When the energy absorption groove 5111 extending in a curved shape moves along the energy absorption strip 52, the energy absorption strip 52 continuously deforms and absorbs the impact force, thus playing a role of buffering and guiding to reduce the severity of the driver injuries. In addition, after the energy absorption block 51 is fractured, the energy absorption strip 52 may also play a role of flexibly connecting the adjustment plate 2 and the first adjustment portion 45 to prevent the upper column 3 and the adjustment plate 2 from falling down in a gravity direction, avoiding secondary injuries to driver's legs caused by the upper column 3 and the adjustment plate 2.

With the steering column 10 for the vehicle according to the embodiments of the present disclosure, during a collision, the upper column 3, the adjustment plate 2, and the energy absorption groove 5111 may move away from the driver. The energy absorption groove 5111 may deform the energy absorption strip 52 to absorb the impact energy. Meanwhile, the energy absorption strip 52 may also prevent the upper column 3 and the adjustment plate 2 from falling downwards, to reduce the severity of driver injuries and improve safety performance of the steering column 10.

In some embodiments of the present disclosure, referring to FIG. 1 to FIG. 4, the energy absorption block 51 includes a body portion 511 and a connection arm 512. The body portion 511 is fixed to the adjustment plate 2. The energy absorption groove 5111 is formed in the body portion 511. The connection arm 512 is connected to the body portion 511. The connection arm 512 is also fixedly connected to the first adjustment portion 45. A weakening structure 513 is formed at a joint between the connection arm 512 and the body portion 511. The weakening structure 513 is located at a side of the first adjustment portion 45 facing towards the adjustment plate 2. That is, in the first direction, a projection of the weakening structure 513 is located between the first adjustment portion 45 and the adjustment plate 2. When the impact force borne by the adjustment plate 2 reaches the predetermined threshold, the body portion 511 is separated from the connection arm 512 at the weakening structure 513. Moreover, the body portion 511 moves along the energy absorption strip 52. When the energy absorption groove 5111 in the body portion 511 moves along the energy absorption strip 52, the energy absorption strip 52 deforms and absorbs energy, realizing an energy absorption effect. The predetermined threshold is smaller than a maximum acting force that is exerted by a steering manipulation apparatus on a human body specified in the national standard (GB11557, the stipulation protecting drivers from being injured by motor vehicle steering mechanism), to protect the driver during the collision. Moreover, the predetermined threshold is greater than a pressure of the driver on the upper column 3 during normal use, to avoid damage of the energy absorption block 51 during the normal use. In some embodiments, the predetermined threshold ranges from 1 KN to 10 KN.

Figure 3:
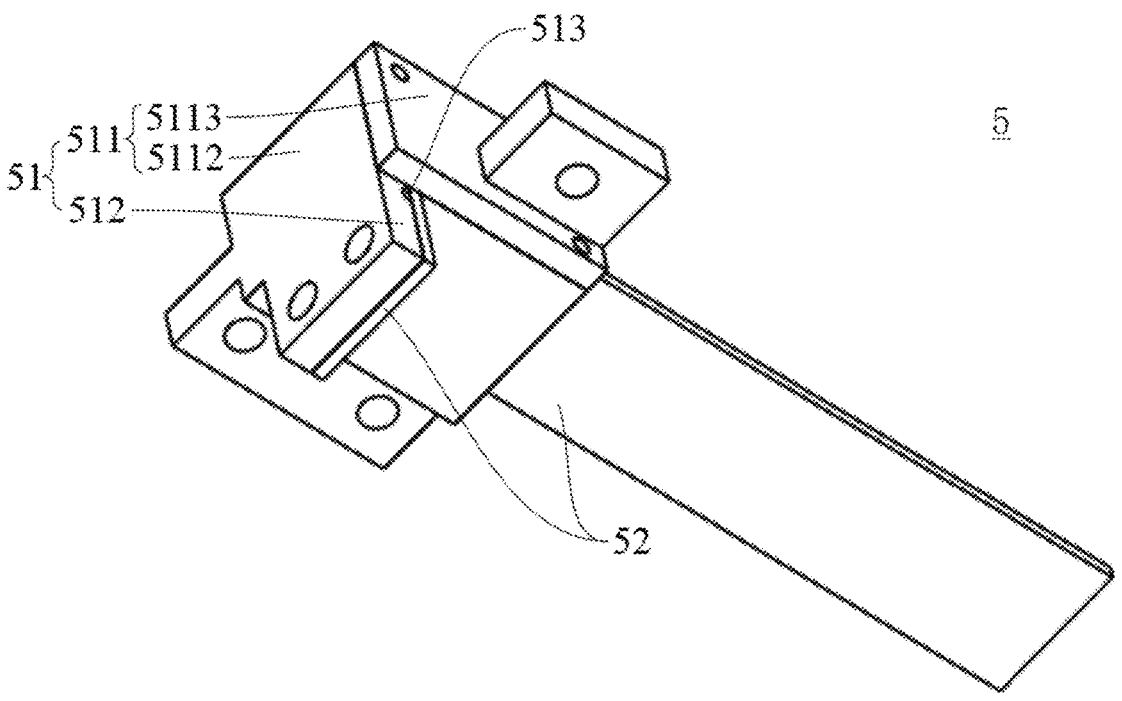
FIG. 3 is a schematic view of an energy absorption mechanism according to an embodiment of the present disclosure.
Figure 4:
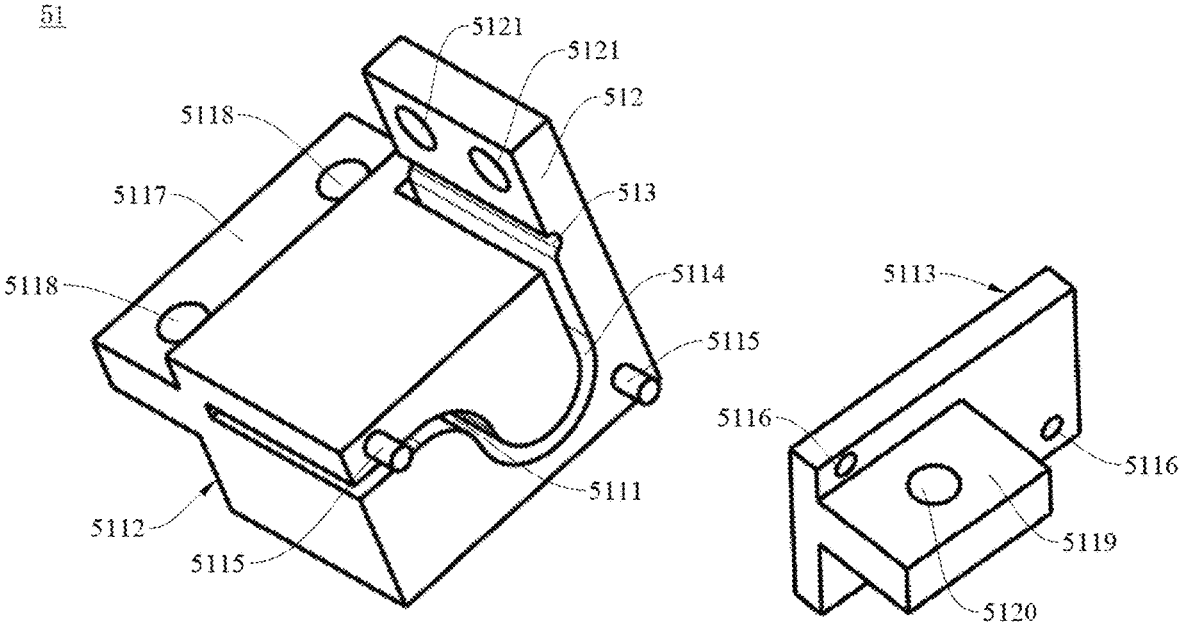
FIG. 4 is an exploded view of an energy absorption block according to an embodiment of the present disclosure.

In some embodiments of the present disclosure, referring to FIG. 2 to FIG. 4, at least a part of the body portion 511 and the connection arm 512 are integrally formed. The body portion 511 and the connection arm 512 may be a structural element made of plastic, such as PA (Polyamide) plastic. The connection arm 512 and the energy absorption strip 52 may be fixedly connected to the first adjustment portion 45 through a fastener 9. In some embodiments, the connection arm 512 may have a first mounting hole 5121 formed thereon. A second mounting hole corresponding to the first mounting hole 5121 may be formed at the end of the energy absorption strip 52 passing through the energy absorption groove 5111. The fastener 9 may be fixed to the first adjustment portion 45 after passing through the first mounting hole 5121 and the second mounting hole. The fastener 9 may be a bolt or a rivet.

In some embodiments of the present disclosure, referring to FIG. 4, the weakening structure 513 includes a thinning groove. The thinning groove may reduce a thickness of a joint between the connection arm 512 and the body portion 511 to weaken a connection strength between the connection arm 512 and the body portion 511. By controlling parameters such as a width and a depth of the thinning groove, the body portion 511 and the connection arm 512 may be separated from each other at the thinning groove when the impact force borne by the adjustment plate 2 reaches the predetermined threshold. When the impact force borne by the adjustment plate 2 does not reach the predetermined threshold, the body portion 511 is connected to the connection arm 512. A length direction of the thinning groove is perpendicular to the first direction and parallel to the adjustment plate 2, to ensure a weaken effect of the thinning groove on the connection strength between the connection arm 512 and the body portion 511.

In other embodiments of the present disclosure, the weakening structure 513 includes a plurality of weakening holes, which may be through holes or blind holes. The plurality of weakening holes may weaken the connection strength between the connection arm 512 and the body portion 511. By controlling parameters such as a quantity of weakening holes, a hole diameter size, and a hole depth, the body portion 511 and the connection arm 512 are separated from each other at the plurality of weakening holes when the impact force borne by the adjustment plate 2 reaches the predetermined threshold. When the impact force borne by the adjustment plate 2 does not reach the predetermined threshold, the body portion 511 is connected to the connection arm 512. The plurality of weakening holes is arranged in a direction perpendicular to the first direction and parallel to the adjustment plate 2, to ensure weaken effects of the plurality of weakening holes on the connection strength between the connection arm 512 and the body portion 511.

In some embodiments of the present disclosure, the adjustment plate 2 has a mounting recess. An opening of the mounting recess may face towards the first adjustment portion 45. The body portion 511 is at least partially disposed in the mounting recess. The mounting recess may be used for improving a connection strength between the body portion 511 and the adjustment plate 2. When the body portion 511 moves along the energy absorption strip 52, at least one side wall of the mounting recess may abut against the first adjustment portion 45, to prevent the body portion 511 from being separated from the adjustment plate 2.

In some embodiments of the present disclosure, as illustrated in FIG. 2 to FIG. 5, the body portion 511 includes a first sub-portion 5112 and a second sub-portion 5113. The energy absorption groove 5111 is formed in the first sub-portion 5112. The connection arm 512 may be connected to the first sub-portion 5112. The energy absorption groove 5111 has a side opening 5114 formed at a side surface of the first sub-portion 5112. The second sub-portion 5113 is adapted to be fixedly connected to the first sub-portion 5112 to block the side opening 5114. The side surface of the first sub-portion 5112 is perpendicular to the energy absorption groove 5111. Therefore, the energy absorption strip 52 can be mounted from the side opening 5114 into the energy absorption groove 5111 extending in a curved shape. Subsequently, the second sub-portion 5113 is fixedly combined with the first sub-portion 5112, to allow the second sub-portion 5113 to block the side opening 5114, making it beneficial to assembly of the energy absorption strip 52 with the body portion 511.

In some embodiments of the present disclosure, one of the first sub-portion 5112 and the second sub-portion 5113 is provided with a positioning pin 5115, and another one of the first sub-portion 5112 and the second sub-portion 5113 has a positioning hole 5116 adapted to be engaged with the positioning pin 5115, to facilitate positioning of the first sub-portion 5112 and the second sub-portion 5113 when fixedly connected to each other. One or more pairs of positioning pin 5115 and positioning hole 5116 may be provided.

In an embodiment of the present disclosure, as illustrated in FIG. 4, the first sub-portion 5112 has two positioning pins 5115 spaced apart from each other at the side surface of the first sub-portion 5112 having the side opening 5114. The second sub-portion 5113 correspondingly has two positioning holes 5116 formed thereon. Each of the two positioning holes 5116 is engaged with a corresponding one of the two positioning pins 5115 in a positioning manner.

In another embodiment of the present disclosure (not shown), the second sub-portion 5113 is provided with two positioning pins 5115 at a side surface of the second sub-portion 5113 blocking the side opening 5114. The first sub-portion 5112 correspondingly has two positioning holes 5116 formed thereon. Each of the two positioning pins 5115 is engaged with a corresponding one of the two positioning holes 5116 in a positioning manner.

In some embodiments of the present disclosure, referring to FIG. 2 to FIG. 4, the body portion 511 may be fixedly connected to the adjustment plate 2 by the fastener 9. In some embodiments, the first sub-portion 5112 is provided with a first mounting table 5117. The first mounting table 5117 is adapted to be lapped at an outer edge of the mounting recess. The first mounting table 5117 has at least one third mounting hole 5118 formed thereon and may be fixed to the adjustment plate 2 by the fastener 9 passing through the third mounting hole 5118. The second sub-portion 5113 is provided with a second mounting table 5119. The first mounting table 5117 and the second mounting table 5119 are located at two opposite sides of the body portion 511, respectively. The second mounting table 5119 is adapted to be lapped at the outer edge of the mounting recess. The second mounting table 5119 has at least one fourth mounting hole 5120 formed thereon and may be fixed to the adjustment plate 2 by the fastener 9 passing through the fourth mounting hole 5120. The fastener 9 may be a bolt or a rivet.

It can be understood that after a vehicle collision occurs, the energy absorption mechanism 5 is damaged. The energy absorption mechanism 5 is detachably connected to the first adjustment portion 45 and the adjustment plate 2 through the fastener 9, respectively. Maintenance of the steering column 10 may be completed only by replacing the energy absorption block 51 and the energy absorption strip 52 after a minor collision of the vehicle occurs. Moreover, the energy absorption block 51 and the energy absorption strip 52 has simple processing processes, low production costs, and are easy and quick to mount and remove, making it beneficial to a reduction in maintenance costs of the steering column 10.

In some embodiments of the present disclosure, referring to FIG. 1, the steering column 10 further includes a second mounting plate 6 adapted to be fixed to a vehicle body of the vehicle. For example, the second mounting plate 6 is fixed to an instrument beam of the vehicle. The first mounting plate 1 is movably connected to the second mounting plate 6 in the first direction. The first mounting plate 1 and the second mounting plate 6 may be connected to each other by a linear bearing. The adjustment mechanism 4 further includes a second lead screw 46. The second lead screw 46 is fixed to the second mounting plate 6. The first adjustment portion 45 is a nut. The drive portion includes a drive motor 41, a drive box, and a first lead screw 44. The drive motor 41 is fixed to the first mounting plate 1 through the drive box. The drive box is in a transmission connection with the drive motor 41, the second lead screw 46, and the first lead screw 44. The drive motor 41 is configured to drive the first adjustment portion 45 to move in the first direction by means of the drive box and the first lead screw 44. The drive motor 41 is further configured to drive the drive box to move along the second lead screw 46 in the first direction. Therefore, position adjustment efficiency of the upper column 3 can be improved, and a space occupied by the steering column 10 can be reduced.

In some embodiments, the drive box is internally provided with a driving gear, a first driven gear 42, and a second driven gear 43. Both the first driven gear 42 and the second driven gear 43 are in a transmission connection with the driving gear, and the drive motor 41 may drive the driving gear to rotate, to drive the first driven gear 42 and the second driven gear 43 to rotate through the driving gear. In some embodiments, a planetary transmission device is further provided between the drive motor 41 and the driving gear. Power outputted by the motor drives the driving gear to rotate after being reduced in speed and increased in torque by the planetary transmission device. Meanwhile, the drive box is further internally provided with an idler gear. The driving gear, the first driven gear 42, and the second driven gear 43 are all engaged with the idler gear. The driving gear drives the first driven gear 42 and the second driven gear 43 to rotate through the idler gear. The idler gear may increase distances among axes of the driving gear, the first driven gear 42, and the second driven gear 43, to facilitate the arrangement of the first lead screw 44, the second lead screw 46, and the drive motor 41.

The first lead screw 44 penetrates the drive box and the first driven gear 42. The first driven gear 42 is engaged with the first lead screw rod in a limiting manner. The first driven gear 42 may drive the first lead screw 44 to rotate. The first lead screw 44 when rotating may drive the first adjustment portion 45 to move in the first direction.

The second lead screw 46 penetrates the drive box and the second driven gear 43. The second driven gear 43 is threadedly engaged with the second lead screw 46. When the second driven gear 43 rotates, the drive box may be driven to move along the second lead screw 46 in the first direction. Moreover, a movement direction of the drive box is the same as a movement direction of the first adjustment portion 45. Meanwhile, both the drive motor 41 and the first mounting plate 1 are connected to the drive box, and the drive motor 41 and the first mounting plate 1 both move synchronously with the drive box, i.e., the drive portion may drive the adjustment plate 2 and the first mounting plate 1 to move synchronously in the first direction. In this way, an adjustable range of the upper column 3 in the first direction can be increased in a limited space. In addition, the adjustment efficiency of the upper column 3 is improved.

In some embodiments of the present disclosure, the energy absorption strip 52 is a steel strip, i.e., the energy absorption strip 52 is made of a steel material. The steel strip is low in cost, easy to process, and good in deformation and energy absorption effects. According to energy absorption requirements, it is possible to adjust a size of the energy absorption groove 5111 and set a length, a thickness, rigidity, and other parameters of the corresponding steel strip, to satisfy design requirements for shrinkable forces and shrinkable distances of different vehicle models.

Figure 5:
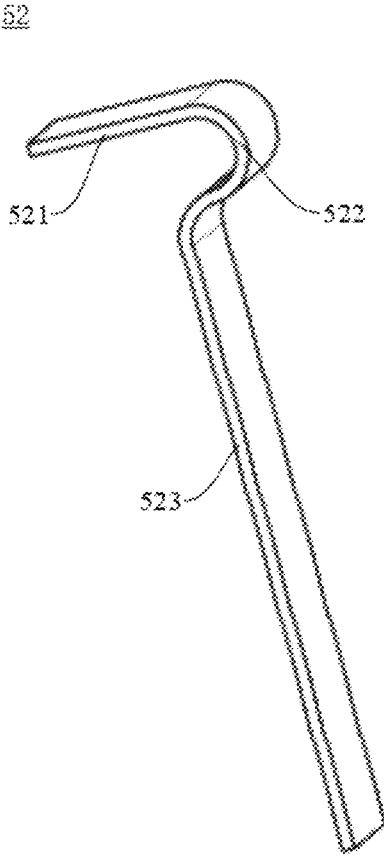
FIG. 5 is a schematic view of an energy absorption strip according to an embodiment of the present disclosure.

Referring to FIG. 4 and FIG. 5, the energy absorption block 51 has an energy absorption groove 5111 extending in a curved shape. The energy absorption groove 5111 follows a path similar to an "L" shape. The energy absorption strip 52 includes a fixed segment 521, a mounting segment 522, and a free segment 523. The fixed segment 521 is connected to the free segment 523 through the mounting segment 522. The fixed segment 521 is located outside the energy absorption groove 5111 and is adapted to be connected to the first adjustment portion 45. The mounting segment 522 is located inside the energy absorption groove 5111 and shaped to match with the energy absorption groove 5111. The free segment 523 is located outside the mounting recess and extends in the first direction. When a collision occurs, the steering wheel, the upper column 3, the adjustment plate 2, and the part of the energy absorption block 51 having the energy absorption groove 5111 move synchronously. The energy absorption groove 5111 slides on the free segment 523. The free segment 523 deforms and absorbs energy within the energy absorption groove 5111. The energy absorption strip 52 may provide buffering and guiding effects for the sliding of the energy absorption groove 5111, while also preventing the steering wheel and the upper column 3 from slipping out of the instrument beam and impacting a driver's body.

A vehicle according to an embodiment of another aspect of the present disclosure includes the steering column 10 in the above embodiments.

With the vehicle according to the embodiments of the present disclosure, during a collision, the upper column 3, the adjustment plate 2, and the energy absorption groove 5111 may move away from the driver. The energy absorption groove 5111 may deform the energy absorption strip 52 to absorb the impact energy. Meanwhile, the energy absorption strip 52 may also prevent the upper column 3 and the adjustment plate 2 from falling downwards, to reduce the severity of the driver injuries and improve the safety performance of the vehicle.

In descriptions of the present disclosure, descriptions with reference to the terms "an embodiment", "some embodiments", "examples", "specific examples", or "some examples" etc., mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples and the features of the different embodiments or examples described in this specification.

Although the embodiments of the present disclosure have been shown and described above, it can be understood the above-mentioned embodiments are exemplary and should not be construed as limiting the present disclosure. For those skilled in the art, changes, modifications, replacements, and variations can be made to the above-mentioned embodiments within the scope of the present disclosure.

What is claimed is:

1. A steering column for a vehicle, the steering column comprising:
    a first mounting plate;
    an adjustment plate movably connected to the first mounting plate in a first direction;
    an upper column fixed to the adjustment plate;
    an adjustment mechanism comprising a drive portion and a first adjustment portion, the drive portion being fixed to the first mounting plate and configured to drive the first adjustment portion to move in the first direction; and
    an energy absorption mechanism comprising an energy absorption block and an energy absorption strip, the energy absorption block being fixedly connected to the adjustment plate and the first adjustment portion, the energy absorption block internally having an energy absorption groove extending in a curved shape, the energy absorption strip having an end passing through the energy absorption groove and fixed to the first adjustment portion and another end extending in the first direction, and the energy absorption groove being movable along the energy absorption strip in the first direction when an impact force borne by the adjustment plate reaches a predetermined threshold.

2. The steering column according to claim 1, wherein the energy absorption block comprises:
    a body portion; and
    a connection arm, wherein:
        the body portion is fixed to the adjustment plate;
        the energy absorption groove is formed in the body portion;
        the connection arm is connected to the body portion and fixedly connected to the first adjustment portion;
        a weakening structure is formed at a joint between the connection arm and the body portion and located at a side of the first adjustment portion facing towards the adjustment plate; and
        when the impact force borne by the adjustment plate reaches the predetermined threshold, the body portion is separated from the connection arm at the weakening structure and moves along the energy absorption strip.

3. The steering column according to claim 2, wherein the weakening structure has a thinning groove, a length direction of the thinning groove being perpendicular to the first direction and parallel to the adjustment plate.

4. The steering column according to claim 2, wherein the adjustment plate has a mounting recess, the body portion being at least partially disposed in the mounting recess.

5. The steering column according to claim 2, wherein the body portion comprises a first sub-portion and a second sub-portion, the energy absorption groove being formed in the first sub-portion and having a side opening formed at a side surface of the first sub-portion, and the second sub-portion being adapted to be fixedly connected to the first sub-portion to block the side opening, wherein the side surface of the first sub-portion is perpendicular to the energy absorption groove.

6. The steering column according to claim 5, wherein:
   one of the first sub-portion and the second sub-portion is provided with a positioning pin; and
   another one of the first sub-portion and the second sub-portion has a positioning hole adapted to be engaged with the positioning pin.

7. The steering column according to claim 1, further comprising a second mounting plate, the first mounting plate being movably connected to the second mounting plate in the first direction, wherein:
   the adjustment mechanism further comprises a second lead screw fixed to the second mounting plate;
   the first adjustment portion is a nut; and
   the drive portion comprises a drive motor, a drive box, and a first lead screw, the drive motor being fixed to the first mounting plate through the drive box, the drive box being in a transmission connection with the drive motor, the second lead screw, and the first lead screw, the drive motor being configured to drive the first adjustment portion to move in the first direction by means of the drive box and the first lead screw, and the drive motor being further configured to drive the drive box to move along the second lead screw in the first direction.

8. The steering column according to claim 1, wherein the energy adsorption strip is a steel strip.

9. A vehicle, comprising the steering column according to claim 1.

10. The vehicle according to claim 9, wherein the energy absorption block comprises:
   a body portion; and
   a connection arm, wherein:
      the body portion is fixed to the adjustment plate;
      the energy absorption groove is formed in the body portion;

the connection arm is connected to the body portion and fixedly connected to the first adjustment portion;
      a weakening structure is formed at a joint between the connection arm and the body portion and located at a side of the first adjustment portion facing towards the adjustment plate; and
      when the impact force borne by the adjustment plate reaches the predetermined threshold, the body portion is separated from the connection arm at the weakening structure and moves along the energy absorption strip.

11. The vehicle according to claim 10, wherein the weakening structure has a thinning groove, a length direction of the thinning groove being perpendicular to the first direction and parallel to the adjustment plate.

12. The vehicle according to claim 10, wherein the adjustment plate has a mounting recess, the body portion being at least partially disposed in the mounting recess.

13. The vehicle according to claim 10, wherein the body portion comprises a first sub-portion and a second sub-portion, the energy absorption groove being formed in the first sub-portion and having a side opening formed at a side surface of the first sub-portion, and the second sub-portion being adapted to be fixedly connected to the first sub-portion to block the side opening, wherein the side surface of the first sub-portion is perpendicular to the energy absorption groove.

14. The vehicle according to claim 13, wherein:
   one of the first sub-portion and the second sub-portion is provided with a positioning pin; and
   another one of the first sub-portion and the second sub-portion has a positioning hole adapted to be engaged with the positioning pin.

15. The vehicle according to claim 9, wherein the steering column further comprises a second mounting plate, the first mounting plate being movably connected to the second mounting plate in the first direction, wherein:
   the adjustment mechanism further comprises a second lead screw fixed to the second mounting plate;
   the first adjustment portion is a nut; and
   the drive portion comprises a drive motor, a drive box, and a first lead screw, the drive motor being fixed to the first mounting plate through the drive box, the drive box being in a transmission connection with the drive motor, the second lead screw, and the first lead screw, the drive motor being configured to drive the first adjustment portion to move in the first direction by means of the drive box and the first lead screw, and the drive motor being further configured to drive the drive box to move along the second lead screw in the first direction.

16. The vehicle according to claim 9, wherein the energy adsorption strip is a steel strip.

* * * * *